United States Patent

[11] 3,584,868

[72] Inventors Frank H. Fromm, Jr.
 4215 State Road, Drexel Hill, Pa. 19026;
 Frank H. Fromm, III, 424 North Manor
 Road, Media, Pa. 19063
[21] Appl. No. 816,478
[22] Filed Mar. 19, 1969
[45] Patented June 15, 1971

[54] TRANSFER APPARATUS
 11 Claims, 9 Drawing Figs.
[52] U.S. Cl. ................................................ 271/84,
 271/14
[51] Int. Cl. ........................................... B65h 29/38
[50] Field of Search ........................................... 271/84, 14,
 54, 85, 55; 310/104

[56] References Cited
UNITED STATES PATENTS
1,378,886  5/1921  Maineri ........................ 271/54
2,578,779  12/1951 Black ........................... 271/54

Primary Examiner—Joseph Wegbreit
Attorney—Louis V. Schiavo

ABSTRACT: A tubular casing is provided with fluid pressure for shifting an insert back and forth within the casing. The insert is coupled to a carriage which mounts a head moved back and forth between a pickup station and a delivery station in response to movement of the insert. The head pick up work at the pickup station, deposits it at the delivery station and returns to the pickup station to complete one cycle of operation.

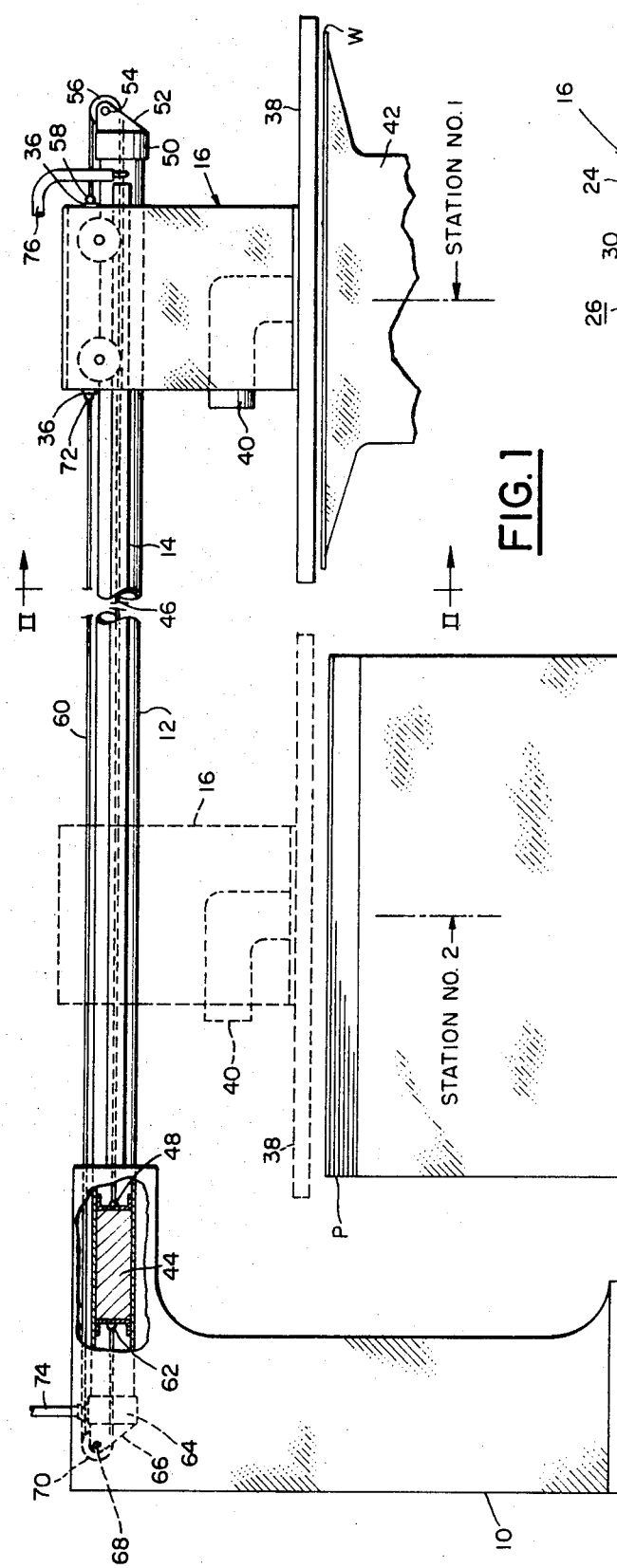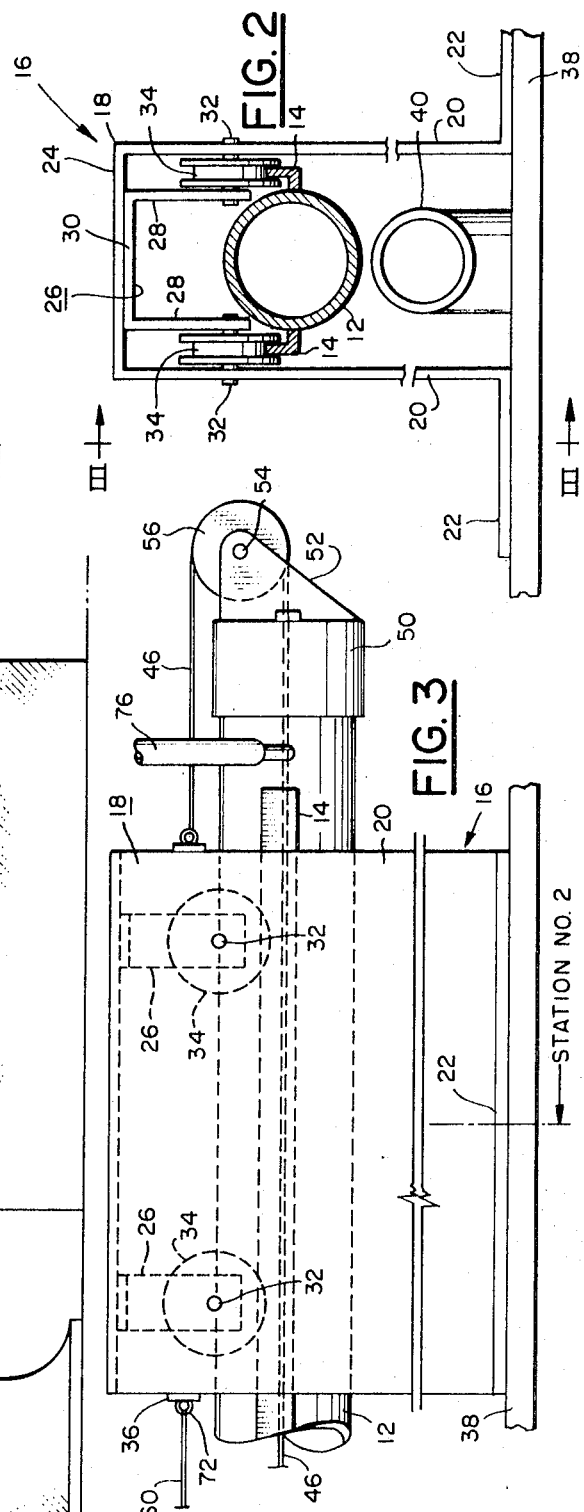

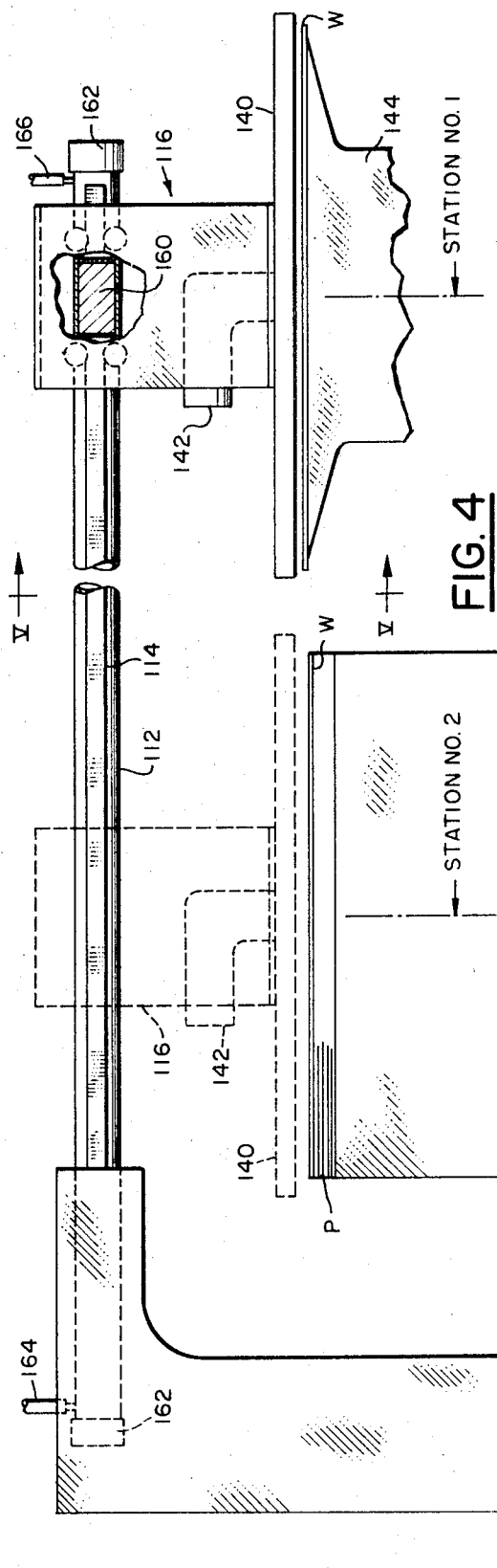
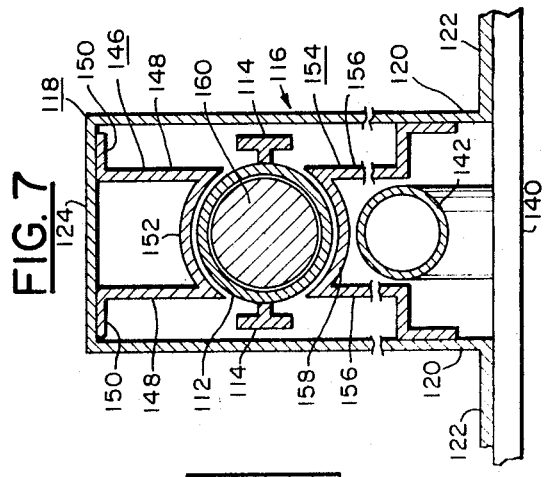
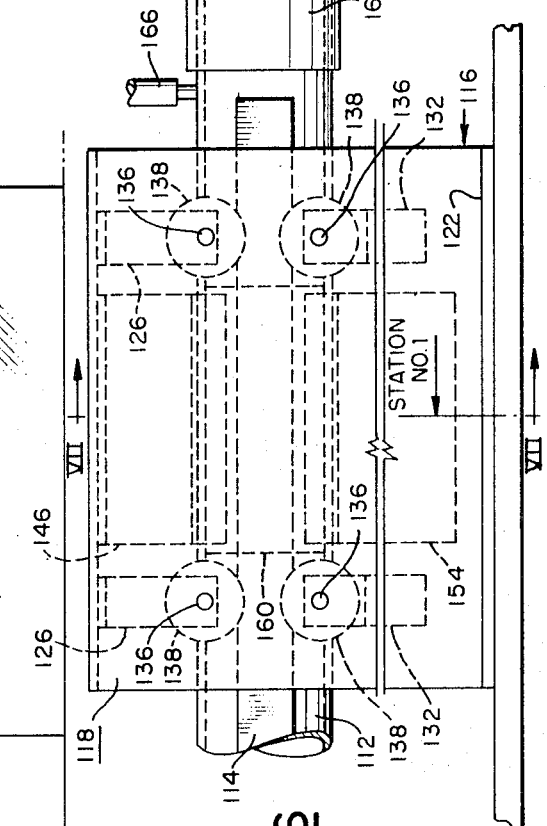

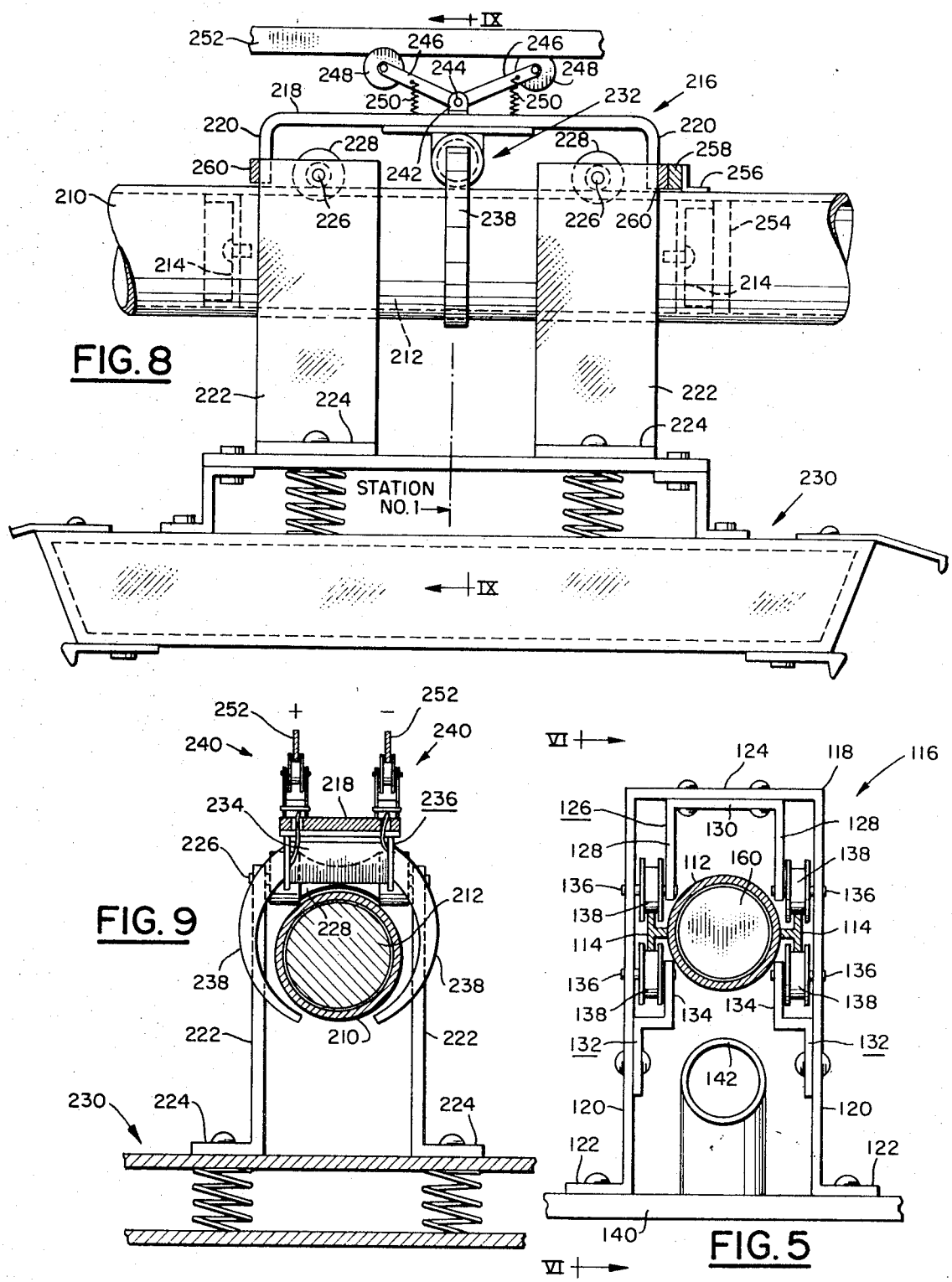

TRANSFER APPARATUS

BACKGROUND OF THE INVENTION

1. Field of the Invention

The present invention relates to transfer apparatus for handling lightweight workpieces.

2. Description of the Prior Art

Prior art transfer apparatus for picking up lightweight workpieces at one station and conveying them to and depositing them at a second station nearby has not proved to be entirely satisfactory because when the simple, light task assigned to the apparatus is taken into consideration, the apparatus is too massive, complicated and involved.

SUMMARY OF THE INVENTION

The present invention is directed to apparatus for the purpose stated hereinbefore characterized by simplicity of design and reduction of mass to an acceptable level.

BRIEF DESCRIPTION OF THE DRAWINGS

FIG. 1 is an elevation showing apparatus constructed in accordance with the invention, the carriage and pickup head being shown in full lines at a pickup station and in phantom at a delivery station;

FIG. 2 is an enlarged section on lines II–II in FIG. 1;

FIG. 3 is an elevation indicated by lines III–III in FIG. 2;

FIG. 4 is an elevation showing modified apparatus constructed in accordance with the invention, the carriage and pickup head being shown in full lines at a pickup station and in phantom at a delivery station;

FIG. 5 is an enlarged section on line V–V in FIG. 4;

FIG. 6 is an elevation indicated by lines VI–VI in FIG. 5;

FIG. 7 is a section on lines VII–VII in FIG. 6;

FIG. 8 is a fragmentary elevation showing another modified apparatus constructed in accordance with the invention; and FIG. 9 is a section on lines IX–IX in FIG. 8.

The following description is directed to the specific embodiments of the invention shown in the drawings and is not intended to be addressed to the scope of the invention, which may be practiced in various other forms.

Referring particularly to FIGS. 1, 2 and 3, the apparatus constructed in accordance with the invention is carried by a table or floor supported structure 10 provided with a head to which is affixed one end of a tubular casing 12 extending laterally from the support 10 across a station, designated No. 1. Extending longitudinally of the casing 12 and affixed respectively to opposite sides thereof are a pair of tracks 14 L-shaped in transverse section.

Mounted upon the tracks 14, at station No. 1, is a carriage 16 comprising a plate 18 provided with laterally spaced legs 20 terminating in outwardly extending flanges 22 and interconnected by a part 24. At each end of the carriage 16 is a bracket 26 underlying the part 24. The bracket 26 is provided with laterally spaced legs 28 interconnected by a part 30 affixed to the part 24 of the plate 18. Each leg 28 of the bracket 26 and the opposed area of the leg 20 of the plate 18 mounts a pin 32 carrying a flanged roller 34 arranged to travel over the associated track 14. Extending across each end of the plate 18 is a bar 36, for a purpose to appear. The carriage 16 carries a pickup head 38 provided with a fitting 40 for connection to a vacuum source. A suitable pickup head for the purpose intended is disclosed in my U.S. Pat. No. 3,314,676, issued Apr. 18, 1967, to which reference may be had for details of construction. The pickup head 38 is located over the platen 42 at station No. 1.

Slidable within the casing 12 is an insert 44 to one end of which is secured a section of cable 46, as at 48. The cable extends through the casing and through a cap 50 which mounts a bracket 52 carrying a pin 54 and a flanged roller 56. The cable 46 is trained around the roller 56 and is connected to one of the bars 36, as at 58. Another section of cable, designated 60, is connected to the other end of the insert, as at 62, and passes through a cap 64 which mounts a bracket 66 carrying a pin 68 and a flanged roller 70. The cable 60 is trained about the roller 70 and is connected to the other bar 36, as at 72. Disposed respectively at opposite ends of the casing are conduits 74 and 76 for connection to a source of compressed air.

Articles of light sheet material W are hand or otherwise placed on platen 42 at station No. 1. The apparatus then removes the article W from the platen 42 and transfers it to station No. 2, where it is deposited, for example upon a pile of such articles, designated P.

In the condition of the apparatus shown in FIG. 1, the article is ready for transfer to station No. 2. Vacuum is induced in the pickup head 38, whereupon the article W is sucked up from the plate 42 and held fast against the undersurface of the pickup head. Air under pressure is then introduced into one end of the casing 12 through the conduit 74 while at the same time the right-hand end of the casing 12 is placed in communication with atmosphere by a valve (not shown) in conduit 76, whereupon the insert 44 is moved to the right, a distance exactly equal to the distance between stations No. 1 and No. 2. As a consequence, the cable 60 is pulled over the roller 70 and the carriage 16 is pulled to the left, carrying the pickup head and the article W with it to station No. 2. Thereupon, the vacuum is broken to release the article W at station No. 2 for deposit on the pile P. After a time delay sufficient for placing a second article W on the platen 42, air under pressure is admitted to the casing 12 through the conduit 76 while at the same time the left-hand end of the casing 12 is placed in communication with atmosphere by a valve (not shown) in conduit 74, whereupon the insert 44 is moved to the left, a distance exactly equal to the distance between stations No. 1 and No. 2. As a consequence, the cable 46 is pulled under the roller 56 and the carriage 16 is pulled to the right, carrying the pickup head with it to station No. 1, its initial position.

Now referring particularly to FIGS. 4 to 7, the modified apparatus is carried by a support 110 provided with a head to which is affixed one end of a tubular casing 112 extending laterally from the support 110 across a station, designated No. 1. The casing 112 is made of nonmagnetic material. Extending longitudinally of the casing and affixed respectively to opposite sides thereof are a pair of tracks 114 T-shaped in transverse section. The tracks 114 are made of nonmagnetic material.

The tracks 114 mount a carriage 116 comprising a plate 118 provided with laterally spaced legs 120 terminating in outwardly extending flanges 122 and interconnected by a part 124. At each end of the plate 118 is a bracket 126 provided with laterally spaced legs 128 and interconnected by a part 130 underlying the part 124 of the plate 118 and affixed thereto. Each leg 120 of the plate 118 carries a pair of brackets 132 respectively affixed to the opposite ends thereof and provided with offset legs 134. The legs 128 of the bracket 126 and the opposed areas of the legs 120 of the plate 118 and the legs 134 of the brackets 132 and the opposed areas of the legs 120 of the plate 118 carry a set of pins 136 mounting flanged roller 138 which travel over the tracks 114, as shown. The carriage 116 carries a pickup head 140 provided with a fitting for connection to a vacuum source. The head 140 is disposed over the platen 144. Affixed to the underside of the part 124 of the plate 118 is a member 146 provided with laterally spaced legs 148 having outwardly turned flanges 150 and interconnected by a part 152 which is arcuately shaped and disposed in close spaced relation to the top of the casing 112. Spanning the legs 120 of the plate 118 is a member 154 provided with laterally spaced legs 156 and interconnected by a part 158 arcuately shaped and disposed in close spaced relation to the underside of the casing 112. The members 146 and 154 are made of magnetic material. Within the casing 112 is a permanent magnet insert 160. Each end of the casing is provided with a cap 162, and disposed respectively at opposite ends of the casing are conduits 164 and 166 for connection to a source of compressed air.

In the condition of the apparatus shown in FIG. 4, the article is ready for transfer to station No. 2. Vacuum is induced in the pickup head 140, whereupon the article W is sucked up from the platen 144 and held fast against the under surface of the pickup head. Air under pressure is then introduced into one end of the casing 112 through the conduit 166 while at the same time the left-hand end of the casing 112 is place in communication with atmosphere by a valve (not shown) in conduit 164, whereupon the insert 160 is moved to the left a distance exactly equal to the distance between stations No. 1 and No. 2. The carriage 116 is magnetically coupled to the insert 160, as a consequence of which it too moves to the left, carrying the pickup head and the article W with it to station No. 2. Thereupon the vacuum is broken and the article W is released at station No. 2 for deposit on a pile of such articles P. After a time delay sufficient for placing a second article W on the platen 144, air under pressure is admitted to the casing 112 through the conduit 164 while at the same time the right-hand end of the casing 112 is placed in communication with atmosphere by a valve (not shown) in conduit 166, whereupon the insert 160 is moved to the right a distance exactly equal to the distance between stations No. 1 and No. 2. As a consequence, the carriage 116, magnetically coupled to the insert 160, is moved to the right, carrying the pickup head with it to station No. 1, its initial position.

Now referring particularly to the modified construction shown in FIGS. 8 and 9, within the casing 210, made of nonmagnetic material, is an insert 212, made of magnetic material, provided with a pair of flanged discs 214 respectively at opposite ends thereof. Mounted directly upon the casing 210 is a carriage 216 provided with a part 218 extending longitudinally thereof in overlying spaced relation to the casing 210. At each end of the part 218 is a turned down portion 220 from which there extend downwardly respectively on opposite sides of the casing 210 a pair of legs 222 terminating in outwardly extending flanges 224. At each end of the carriage a pin 226 extends through the legs 222 and mounts a roller 228. The legs 222 carry the pickup head 230. Reference may be had to U.S. Pat. No. 3,314,676 for a suitable pickup head.

Underlying the part 218 of the carriage 216 is an electromagnetic unit 232 comprising a winding 234 about a soft iron core 236 having depending arms 238 which embrace the casing 210. Mounted upon the body 218 are a pair of trolleys 240 electrically connected to the electromagnet winding. Each trolley comprises a bracket 242 mounting a pin 244 about which pivots a pole 246 carrying a flanged roller 248. The pole is urged upwardly by a compression spring 250 into contact with an electric conductor 252. Each end of the casing 210 is provided with a clip 256 which mounts a resilient bumper 258 for contact with a similar bumper 260 carried by the carriage 216. The winding of the electromagnet 232 being connected across the conductors 252 is energized thereby, whereupon the core 236 is energized to set up a magnetic field across the insert of magnetic material 212. Thus the carriage is coupled to the insert and moves with it when the latter is propelled between stations No. 1 and No. 2. Exact positioning of the pickup head is effected through the medium of the bumpers 258 and 260.

Although this invention has been described with respect to specific embodiments thereof, it will be appreciated by one skilled in the art that the invention is broad enough to encompass all equivalent embodiments thereof without departing from the spirit and scope of the invention as set forth in the foregoing specification and the appended claims. For example, as described, the inserts 44, 160 and 212 are pneumatically actuated. However, they could be hydraulically actuated. Furthermore, as described and shown, the pickup heads 38, 140 and 230 are of the type that operates by vacuum induction, and that is particularly suited for handling sheet material, for example, sheets of paper or textile material. However, another type of pickup head may be used, depending upon the nature of the workpiece to be handled. For example, for handling lightweight workpieces of magnetic material, an electromagnetic pickup head may be used. Still further, the casing 112 and 210 are straight throughout their full length. However, it will be appreciated that the casing may be curvilinear.

What we claim is:

1. In apparatus for transferring workpieces from a pickup station to a delivery station, the combination comprising
   A. a tubular casing with longitudinally spaced portions respectively at said pickup and delivery stations,
   B. a fluid pressure actuated member within said casing shiftable by said fluid pressure back and fort between said stations,
   C. a carriage on the outer side of said casing provided with rollers,
   D. a pickup head mounted upon said carriage,
   E. means paralleling said casing and providing guidance for said rollers and thereby said carriage, and
   F. means coupling said carriage to said member for movement of said carriage and pickup head back and forth between said stations in response to movement of said member, said pickup head being operable for picking up said workpieces at said pickup station and releasing the same for deposit at said delivery station.

2. The combination according to claim 1 wherein the casing and fluid actuated member are both cylindrical in transverse section and said fluid actuated member is slidably fitted in said casing.

3. The combination according to claim 1 wherein the roller and roller guide means are each disposed respectively on opposite sides of the casing and the roller guide means are carried directly by the casing.

4. The combination according to claim 1 wherein the fluid pressure actuated member and the carriage are interconnected by flexible cable means and thereby coupled together for movement simultaneously in opposite directions.

5. The combination according to claim 4 wherein the flexible cable means extends from the fluid actuated member in opposite directions through closed opposite ends of the casing to the carriage.

6. The combination according to claim 5 wherein, after passing through each closed end of the casing, the flexible cable means is trained about antifriction guide means and thereby turned back upon itself for connection to the carriage.

7. The combination according to claim 1 wherein the casing is made of nonmagnetic material, the carriage is provided with means disposed in close spaced relation to said casing and made of magnetic material, and said fluid actuated member is magnetized thereby to couple said carriage to said fluid actuated member for movement together in the same direction.

8. The combination according to claim 2 wherein the casing is made of nonmagnetic material, the carriage is provided with means made of magnetic material and provided with substantial surface areas arcuate in transverse section disposed in overlying close spaced relation to said casing, and said fluid actuated member is magnetized thereby to couple said carriage to said fluid actuated member for movement together in the same direction.

9. The combination according to claim 1 wherein the casing is made of nonmagnetic material, the fluid pressure actuated member is made of magnetic material, the carriage mounts an electromagnet embracing said casing, and means is provided for energizing said electromagnet.

10. The combination according to claim 9 wherein the means for energizing the electromagnet includes an electric conductor extending along the casing, trolley means mounted upon the carriage and operatively engaging said conductor, and means connecting said trolley with said electromagnet.

11. The combination according to claim 10 wherein the electric conductor is a rigid member, and the trolley is provided with means engaging said trolley and thereby securing the carriage against turning about the casing.